US009660480B2

(12) United States Patent
Yoon et al.

(10) Patent No.: US 9,660,480 B2
(45) Date of Patent: May 23, 2017

(54) WIRELESS CHARGING METHOD AND ELECTRONIC DEVICE IMPLEMENTING THE SAME

(71) Applicant: Samsung Electronics Co., Ltd., Gyeonggi-do (KR)

(72) Inventors: Piljoo Yoon, Gyeonggi-do (KR); Bokun Choi, Seoul (KR); Yongjoon Jeon, Gyeonggi-do (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 190 days.

(21) Appl. No.: 14/465,821

(22) Filed: Aug. 21, 2014

(65) Prior Publication Data

US 2015/0054458 A1 Feb. 26, 2015

(30) Foreign Application Priority Data

Aug. 21, 2013 (KR) .................. 10-2013-0099218

(51) Int. Cl.
*H02J 7/00* (2006.01)
*H02J 7/02* (2016.01)
*H02J 5/00* (2016.01)

(52) U.S. Cl.
CPC ............. *H02J 7/025* (2013.01); *H02J 5/005* (2013.01); *H02J 7/0047* (2013.01); *H02J 2007/005* (2013.01); *H02J 2007/0096* (2013.01)

(58) Field of Classification Search
CPC ......... H02J 2007/005; H02J 2007/0096; H02J 5/005; H02J 7/0047; H02J 7/025
See application file for complete search history.

(56) References Cited

U.S. PATENT DOCUMENTS

| 2009/0140692 | A1 | 6/2009 | Hwang | |
| 2010/0244576 | A1* | 9/2010 | Hillan | G06K 7/0008 307/104 |
| 2011/0081857 | A1 | 4/2011 | Lee et al. | |
| 2012/0329405 | A1* | 12/2012 | Lee | H02J 17/00 455/73 |
| 2013/0002191 | A1 | 1/2013 | Jung et al. | |
| 2013/0091225 | A1* | 4/2013 | Eaton | H02J 7/025 709/206 |

FOREIGN PATENT DOCUMENTS

| KR | 10-2009-0053605 | 5/2009 |
| KR | 10-2011-0037732 | 4/2011 |
| KR | 10-2011-0103366 | 9/2011 |
| KR | 10-2011-0133111 | 12/2011 |

* cited by examiner

*Primary Examiner* — Vuthe Siek

(57) ABSTRACT

Disclosed is a wireless charging technology for portable electronic devices. A wireless charging method of resonance type can enhance the usability of wireless charging and also promote user's satisfaction. The portable electronic device is configured to wirelessly connect with a wireless power supply device, connect with one or more external devices, and transmit a message for requesting a wireless charging process for the external devices to the wireless power supply device.

18 Claims, 19 Drawing Sheets

WIRELESS CHARGING METHOD AND ELECTRONIC DEVICE IMPLEMENTING THE SAME

CROSS-REFERENCE TO RELATED APPLICATION(S) AND CLAIM OF PRIORITY

The present application is related to and claims the benefit under 35 U.S.C. §119(a) of a Korean patent application filed on Aug. 21, 2013 in the Korean Intellectual Property Office and assigned Serial No. 10-2013-0099218, the entire disclosure of which is hereby incorporated by reference.

TECHNICAL FIELD

The present disclosure relates to wireless charging technology for portable electronic devices.

BACKGROUND

Nowadays manufacturers of portable electronic devices such as smart phones and table PCs have tried to introduce a wireless charging function to their portable electronic devices. As a result, some of portable electronic devices, which can be launched recently or to be launched, begin to support a wireless charging function.

SUMMARY

To address the above-discussed deficiencies, it is a primary object to provide a solution for enhancing the usability of wireless charging and for promoting user's satisfaction by improving a wireless (also known as contactless) charging method of resonance type in a portable electronic device.

In a first example, a method for providing wireless charging in a portable electronic device is provided. The method includes wirelessly connecting with a wireless power supply device. The method also includes connecting with at least one external device. The method further includes transmitting a message for requesting a wireless charging process for the connected external device to the wireless power supply device.

In a second example, a portable electronic device includes a battery. The portable electronic device also includes a wireless charging unit configured to receive wirelessly electric power from a wireless power supply device and to charge the battery. The portable electronic device further includes a short-range wireless communication unit configured to connect with at least one external device and to connect with the wireless power supply device. The portable electronic device includes a control unit configured to control the short-range wireless communication unit to transmit a message for requesting a wireless charging process for the connected external device to the wireless power supply device.

Before undertaking the DETAILED DESCRIPTION below, it can be advantageous to set forth definitions of certain words and phrases used throughout this patent document: the terms "include" and "comprise," as well as derivatives thereof, mean inclusion without limitation; the term "or," can be inclusive, meaning and/or; the phrases "associated with" and "associated therewith," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases can be provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference can be now made to the following description taken in conjunction with the accompanying drawings, in which like reference numerals represent like parts.

DETAILED DESCRIPTION

Figure 1:
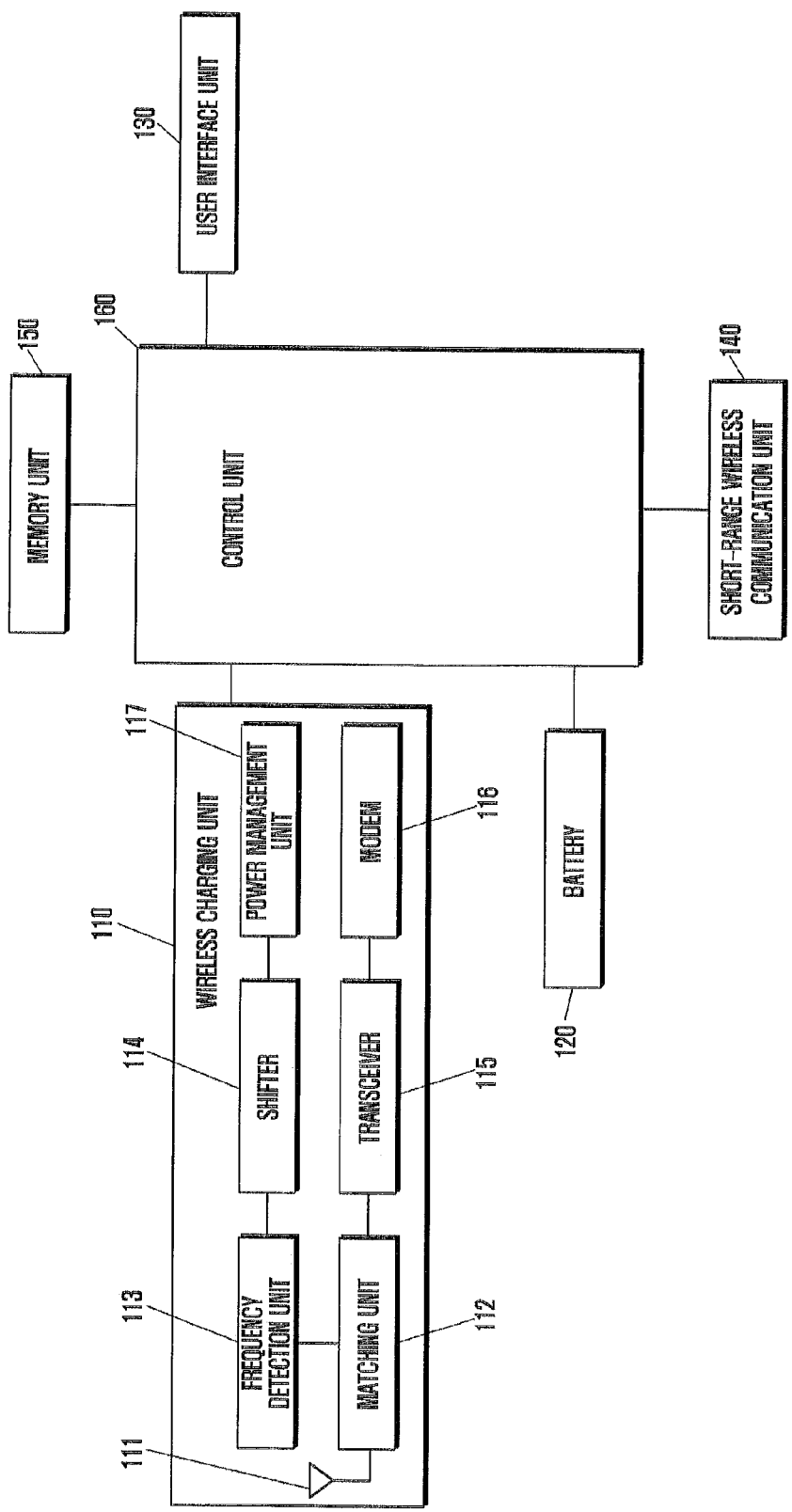
FIG. 1 is an example block diagram illustrating a portable electronic device according to this disclosure.

FIGS. 1 through 12, discussed below, and the various embodiments used to describe the principles of the present disclosure in this patent document can be by way of illustration only and should not be construed in any way to limit the scope of the disclosure. Those skilled in the art will understand that the principles of the present disclosure can be implemented in any suitably arranged electronic device. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness. The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents. It is to be understood that the singular forms "a," "an," and "the" include plural referents unless the context clearly dictates otherwise. Thus, for example, reference to "a device" includes reference to one or more of such devices.

Normally wireless charging technology can be classified into an electromagnetic induction type and a resonance type. The former can have merits of a low power loss but can have drawbacks of a limited power transmission distance. In contrast, the latter can have drawbacks of a high power loss but can have merits such as the capability to extend a power transmission distance to about ten meters theoretically and the ability to charge several portable electronic devices. Especially, wireless charging technology of a resonance type can be to maximize a wireless transmission rate of energy by means of resonance between antennas of a portable electronic device and of a wireless power supply device. For this, such a wireless power supply device can establish a resonance channel using a resonance frequency adapted to a target portable electronic device and can then transmit wireless power through the resonance channel.

In a resonance type, a portable electronic device can merely offer a function to receive power from a wireless power supply device. A user of a portable electronic device may have no authority to control a charging process and can also fail to check basic information such as charging efficiency, charger information, a charging algorithm, and the like. Simply a battery of a portable electronic device can be charged under the control of a wireless power supply device. For example, in case a smart phone and a table PC are being charged together through a wireless charger at a certain place, a user can quickly charge for the tablet PC. However, when the smart phone has a charging priority defined in a wireless power supply device, a user has no way of changing a charging priority.

Meanwhile, what can be called appcessory (such as application plus accessory) has attracted attention as a new trend in the field of portable electronic devices. Namely, instead of trying to insert every possible function into a portable electronic device, a new function can be often developed and utilized in the form of both a peripheral device (such as an accessory) and a particular application of a portable electronic device adapted to support the peripheral device. For higher functionality and convenience in use, most of peripheral devices today have been developed to be available for a wireless network such as Bluetooth. However, such peripheral devices can require periodic and repeated charging. Additionally, due to an absence of any integrated management system, it can be difficult for users to check a current battery status of peripheral devices.

Contrary to a conventional charging type by wire, a wireless charging of resonance type can suffer a rapid variation in charging efficiency according to a distance between a portable electronic device and a wireless power supply device, a location of a portable electronic device, a placed angle of a portable electronic device, a medium existing between a portable electronic device and a wireless power supply device, and the like. Especially, degradation of charging efficiency caused by a distance or a location can be perceived to some extent by users, but degradation of charging efficiency caused by an angle may not be easily perceived.

Therefore, in this case, users can often fail to find the cause of degradation of charging efficiency. Further, there can be no way of finding whether charging efficiency is degraded due to too many portable electronic devices connected with a wireless power supply device or due to any abnormal status of a portable electronic device. Thus, users can often have difficulty in coping effectively with degradation of charging efficiency.

In this disclosure, a wireless power supply device can receive information about a portable electronic device, such as identification information, type, location, charging status, etc. of the portable electronic device, through a magnetic field communication with the portable electronic device. Based on this information about the portable electronic device, the wireless power supply device can transmit electric power to the portable electronic device. For the above, the wireless power supply device can include a power conversion unit configured to receive electric power from any external power supply source or a battery equipped therein and to convert the received power into a power signal whose waveform has a resonance frequency band between the wireless power supply device and the portable electronic device. Additionally, the wireless power supply device can further include a modem configured to modulate data to be transmitted to the portable electronic device and to demodulate a data signal received from the portable electronic device into data, a matching unit configured to match a resonance frequency and impedance between the wireless power supply device and the portable electronic device and to vary a resonance frequency, and an antenna configured to transmit a power signal containing a data signal inserted therein to the portable electronic device and to receive such a data signal from the portable electronic device and then transmit it to the modem. Also, the wireless power supply device can further include a short-range communication module (such as a Bluetooth module, a Zigbee module, an RFID (Radio Frequency Identification) module, an infrared communication module, etc.) for a short-range communication with the portable electronic device.

In this disclosure, the wireless power supply device can be formed of a fixed type. In case of a fixed type, the wireless power supply device can be installed at a ceiling or furniture such as a table in doors, at a bus stop, a subway station, and the like, out of doors, or inside a vehicle such as a car, a train or a subway. Alternatively, the wireless power supply device can be formed of a movable type. In this case, the wireless power supply device can have a battery equipped therein and wirelessly transmit AC power, converted from DC power of the battery, to the portable electronic device.

In this disclosure, the portable electronic device can include a battery, a wireless charging unit for charging the battery with electric power received from the wireless power supply device, and a short-range wireless communication unit for establishing a short-range wireless communication channel with any external device and then performing a data communication. Such a portable electronic device can include, for example, but not limited to, a smart phone, a digital camera, a tablet PC, a notebook PC, a portable media player (such as an MP3 player), a personal digital assistant (PDA), a wireless headset, a wearable computing device (such as a watch, glasses, etc.), or any other equivalents. Among them, a wireless headset, a watch, glasses, and the like can be utilized as a peripheral device of other portable electronic device (such as a smart phone). Additionally, a keypad, a mouse, a sensor that detects physical quantity (such as temperature, pressure, humidity, velocity, etc.) and can then transmit information corresponding to the detected quantity to the portable electronic device, and the like can be used as a peripheral device that has a battery, a wireless charging unit, and a short-range wireless communication unit.

FIG. 1 is an example block diagram illustrating a portable electronic device according to this disclosure.

Referring to FIG. 1, the portable electronic device 100 can include, but not limited to, a wireless charging unit 110, a battery 120, a user interface unit 130, a short-range wireless communication unit 140, a memory unit 150, and a control unit 160.

The wireless charging unit 110 can include an antenna 111, a matching unit 112, a frequency detection unit 113, a shifter 114, a transceiver 115, a modem 116, and a power management unit 117. The antenna 111 can have a receiving antenna for receiving a power signal, containing a data signal inserted therein, from a wireless power supply device, and a transmitting antenna for transmitting such a data signal to the wireless power supply device. The matching unit 112 can have a resonance frequency matching device for matching a resonance frequency between the wireless power supply device and the portable electronic device 100, and an impedance matching device for matching impedance between the wireless power supply device and the portable electronic device 100. The matching unit 112 can further have any circuitry device for varying a resonance frequency under the control of the control unit 160. The frequency detection unit 113 can detect the frequency of a power signal received from the wireless power supply device through the antenna 111. The shifter 114 can adjust a voltage level of a power signal by using a detected frequency and output an adjusted power signal to the power management unit 117. Then the power management unit 117 can charge the battery 120 with such a power signal received from the shifter 114. The transceiver 115 can have a receiver for extracting a data signal inserted in a power signal and then delivering the extracted signal to the modem 116, and a transmitter for receiving a data signal from the modem 116 and then delivering the received signal to the antenna 111. The modem 116 not only can modulate data received from the control unit 160 to a data signal and then deliver it to the transceiver 115, but also can demodulate a data signal received from the transceiver 115 to data and then deliver it to the control unit 160.

The user interface unit 130, acting as the point of interaction between a user and the portable electronic device 100, can include an input interface and an output interface that offers a visual, audible or tactile feedback to a user in response to input information received by the input interface. The input interface can include, for example, a touch panel, a microphone, a sensor unit, a camera, and a global positioning system (GPS) receiver. The output interface can include, for example, a display unit, a speaker, and a vibration motor.

The touch panel can be configured to create touch data in response to a user's touch gesture and then to deliver the touch data to the control unit 160. The touch panel can be placed on the display unit (such as referred to as add-on type) or inserted in the display unit (such as referred to as on-cell type or in-cell type). Normally a combination of the touch panel and the display unit can be referred to as a touch screen. The control unit 160 can detect touch data and control the portable electronic device 100 in response to the touch data. The microphone can receive sound such as a user's voice, convert the received sound into an electric signal, convert the electric signal into audio data through analog-to-digital conversion, and then output it to the control unit 160. Then the control unit 160 can detect voice data from the received audio data and then control the portable electronic device 100 in response to the detected data. The sensor unit can detect a change in status of the portable electronic device 100 (such as a change in posture), create sensing data associated with such a detection, and output it to the control unit 160. Then the control unit 160 can detect the sensing data and control the portable electronic device 100 in response to the detected data. For example, the sensor unit can have various sensors such as an acceleration sensor, a gyro sensor, a luminance sensor, a proximity sensor, and a pressure sensor. The camera captures an image of a subject for photography and then outputs it to the control unit 160. Specifically, the camera can include a lens for collecting light, an image sensor for converting collected light into an electric signal, and an image signal processor (ISP) for converting such an electric signal into image data and then outputting it to the control unit 160. The ISP can process (such as compress) image data and deliver it to the control unit 160. Then the control unit 160 can detect the image data and control the portable electronic device 100 in response to the detected data. The GPS receiver can receive GPS signals from GPS satellites, calculate the position of the portable electronic device 100 by using the received GPS signals, and output position information to the control unit 160. Then the control unit 160 can detect position information and control the portable electronic device 100 in response to the detected information.

The display unit can convert image data received from the control unit 160 into an analog signal and then display it on the screen. The display unit can be formed of a display panel such as LCD (Liquid Crystal Display), OLED (Organic Light Emitted Diode), AMOLED (Active Matrix OLED), or any equivalent. The speaker can convert audio data received from the control unit 160 into sound and output it. The vibration motor can offer a haptic-related feedback. For example, in case touch data is detected, the control unit 160 can vibrate the vibration motor.

The short-range wireless communication unit 140 can perform a data communication with external devices through a short-range wireless communication network. The short-range wireless communication unit 140 can include a plurality of band communication units. For example, the short-range wireless communication unit 140 can have the first band communication unit and the second band communication unit, which can be respectively formed of Wi-Fi modules and support 2.4 GHz and 5 GHz. Alternatively, each of such band communication units can support any other frequency band, depending on a design scheme. Thus, the short-range wireless communication unit 140 can simultaneously receive or transmit a data signal of the first frequency band and a data signal of the second frequency band. Also, the short-range wireless communication unit 140 can transmit a data signal of a certain frequency band and receive a data signal of any other frequency band. Meanwhile, the first and second frequency bands can be determined as the same frequency band (such as 2.4 GHz). In this case, the first and second frequency bands can be determined as non-overlapped orthogonal channels. For example, when the first and second frequency bands are determined as a 2.4 GHz band composed of fourteen channels in total, an interval between adjacent channels can be 5 MHz and each channel can have a band of 22 MHz. In case the first, sixth and eleventh channels are not overlapped with each other, the first frequency band can be determined as the first channel and the second frequency band can be determined as the sixth or eleventh channel. The short-range wireless communication unit 140 can further include a Bluetooth module, an NFC (Near Field Communication) module, etc. in addition to a Wi-Fi module.

The memory unit 150 can store, under the control of the control unit 160, data created during the operation of the portable electronic device 100 or received from any external device through the short-range wireless communication unit 140. Also, the memory unit 150 can have a buffer that temporarily stores data. And also, the memory unit 150 can store various types of setting information (such as about screen brightness, about whether to create a vibration in response to a touch, about whether to automatically rotate a screen, etc.) used for setting usage environments of the portable electronic device 100. By referring to such setting information, the control unit 160 can operate the portable electronic device 100.

The memory unit 150 can store various programs required for the operation of the portable electronic device 100, such as a booting program, at least one operating system (OS), and applications. Particularly, the memory unit 150 can store a wireless charging operation module, which can be a specific program designed for the control unit 160 to perform various operations discussed herein. The wireless charging operation module can be an application or a part of an operating system.

The memory unit 150 can have a main memory and a secondary memory. The main memory can be formed of RAM and the like. The secondary memory can be formed of disk, RAM, ROM, flash memory, and the like. The main memory can store various programs, such as a booting program, an operating system and applications, which can be loaded from the secondary memory. When electric power can be supplied from the battery 120 to the control unit 160, the booting program can be loaded first on the main memory. The booting program can load the operating system on the main memory, and then the operating system can load a selected application on the main memory. The control unit 160 (such as an application processor) can access the main memory, interpret commands (such as routines) of loaded programs, and perform a particular function according to an interpretation result. Namely, various programs can be loaded on the main memory and then run as a processor.

The control unit 160 can control the whole operation of the portable electronic device 100, control signal flows between internal components of the portable electronic device 100, perform data processing, and control the supply of power from the battery 120 to the respective components. The control unit 160 can include an application processor (AP) which can execute a variety of programs stored in the memory unit 150. Namely, the application processor can load various programs from the secondary memory to the main memory and then activate them as processors. Particularly, the application processor can execute the wireless charging operation module as a processor. Also, the application processor can enable a multi-processing of programs.

The control unit 160 can further include various processors in addition to the application processor. For example, the control unit 160 can include a graphic processing unit (GPU) that can be in charge of graphic processing. Additionally, in case the portable electronic device 100 has a mobile communication module (such as a 3-generation mobile communication module, a 3.5-generation mobile communication module, a 4-generation mobile communication module, etc.), the control unit 160 can further include a communication processor (CP) that is in charge of mobile communication processing. Such processors can be formed of a single package into which two or more independent cores (such as quad-core) can be integrated as a single integrated circuit (IC). For example, the application processor can be integrated as a single multi-core processor. Also, such processors can be integrated into a single chip (such as system on chip (SoC)). Alternatively, such processors can be packaged in the form of multi-layer.

Meanwhile, although not discussed above, the portable electronic device 100 can further include any other element such as a peripheral interface (such as a USE module) that can be connected with any external device and then can perform a data communication.

The portable electronic device 100 in this disclosure can be registered in the wireless power supply device through a pairing procedure, for example, which can include an authentication process and a resonance frequency setting process. When this pairing procedure is completed, the portable electronic device 100 can receive electric power from the wireless power supply device. An authentication process may not always be required in a pairing procedure. However, as when a wireless access point (AP) purchased by a certain user is locked with a password to prevent the use of unauthenticated users, an authentication process can be needed in general to prevent any unauthorized device from being automatically charged using the wireless power supply device (such as, to permit a device only registered in a wireless charging pad to be charged). This authentication process can be performed once only at the first time, and after that, an automatic connection can be allowed. By the way, when any portable electronic device can be located at home or in an office, or when any portable electronic device that allows a wireless charging can be further purchased, it can be troublesome to register all of such devices in the wireless power supply device.

The portable electronic device 100 in this disclosure can support a function to allow other portable electronic devices (especially, peripheral devices thereof) to be charged even though such devices may not be registered in the wireless power supply device. For example, the portable electronic device 100 can notify the wireless power supply device that other portable electronic device has been authenticated by the portable electronic device 100. Therefore, other portable electronic device can receive electric power from the wireless power supply device without any further authentication procedure and then charge its own battery. Now, this wireless charging method will be described with reference to FIGS. 2 and 3.

Figure 2:
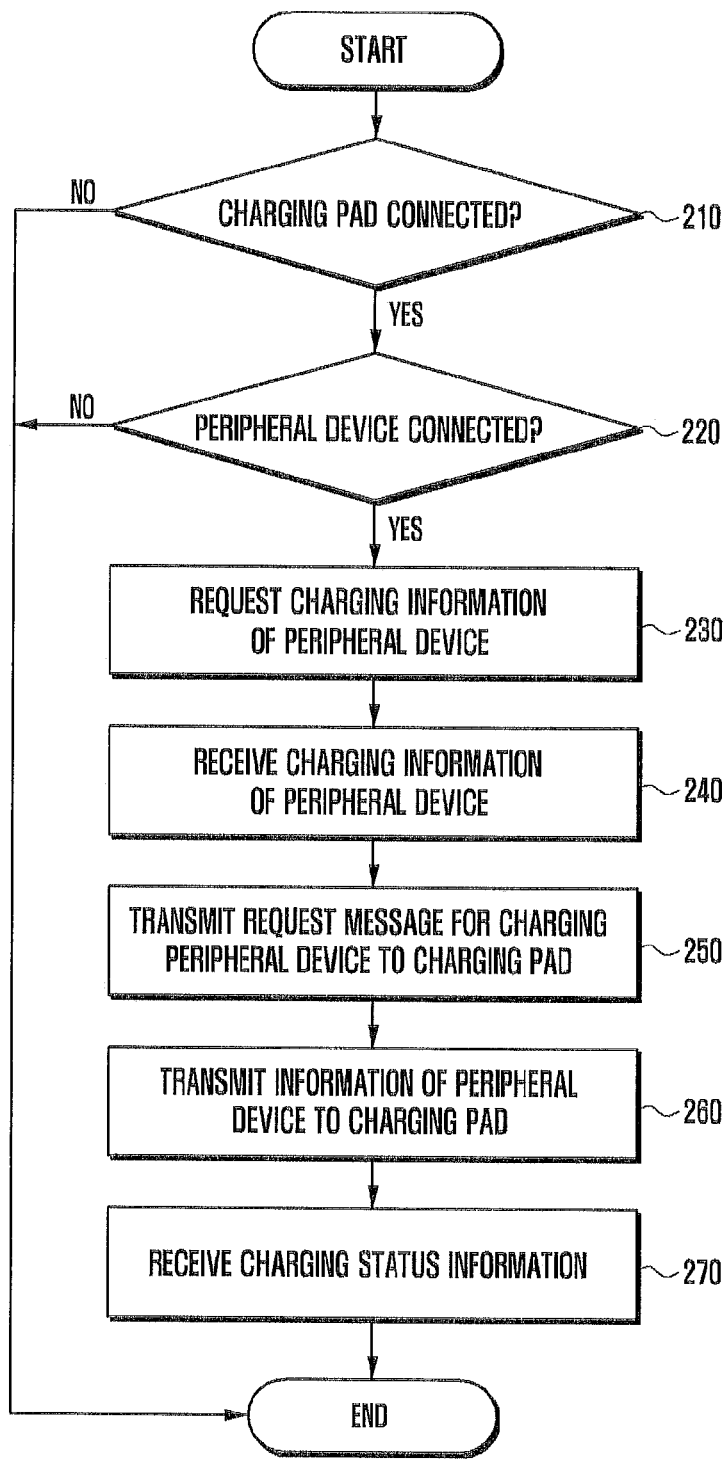
FIG. 2 is an example flow diagram illustrating a wireless charging method without any authentication procedure according to this disclosure.

FIG. 2 is an example flow diagram illustrating a wireless charging method without any authentication procedure according to this disclosure.

Referring to FIG. 2, at operation 210, the control unit 160 can determine whether a charging pad (such as a wireless power supply device) is connected. If so, the control unit 160 can further determine at operation 220 whether any peripheral device is connected. This connection with a peripheral device can be performed through one of various short-range wireless communication techniques such as Bluetooth, Zigbee, RFID, infrared communication, and the like. In case of Bluetooth (BT), BT 3.0 can support a speed up to 24 Mbps, and BT 4.0 (BLE) can support a data communication with lower power than BT 3.0 while maintaining a speed up to 24 Mbps. Additionally, the portable electronic device 100 can support a dual mode in which a simultaneous use of BT 3.0 and BT 4.0 can be allowed. Also, the portable electronic device 100 can be connected with a plurality of peripheral devices through Bluetooth and can manage respective peripheral devices on the basis of their profiles and device IDs. A profile of a peripheral device can contain an IP address, a MAC address, battery percentage information, resonance frequency band information, and the like.

When it is determined at operation 220 that a certain peripheral device is connected, the control unit 160 can control at operation 230 the short-range wireless communication unit 140 to transmit a charging information request message to the connected peripheral device. In reply to this request message, the peripheral device can transmit a response message containing its own charging information (such as an IP address, a MAC address, an ID, battery percentage information, resonance frequency band information, etc.) to the portable electronic device 100. Therefore, at operation 240, the control unit 160 can receive charging information of the peripheral device through the short-range wireless communication unit 140.

When charging information is received from the peripheral device, the control unit 160 can control at operation 250 the short-range wireless communication unit 140 to transmit a request message for charging the peripheral device to the charging pad. Alternatively, when the charging pad is merely connected, and when electric power is not received currently, the control unit 160 can control at operation 250 the wireless charging unit 110 to transmit a request message to the charging pad. In reply to such a request message, the charging pad can transmit a response message for accepting a charging process to the portable electronic device 100. Thus, the control unit 160 can receive a response message through the short-range wireless communication unit 140 or the wireless charging unit 110. Then, at operation 260, the control unit 160 can control the short-range wireless communication unit 140 to transmit information (such as a profile) about the peripheral device to the charging pad. Alternatively, when the charging pad is merely connected, and when electric power is not received currently, the control unit 160 can control at operation 260 the wireless charging unit 110 to transmit information about the peripheral device to the charging pad. Therefore, based on received information about the peripheral device, the charging pad can be connected with the peripheral device and then supply electric power to the connected peripheral device. When the supply of electric power from the charging pad is started, the peripheral device can transmit periodically charging status information (such as a battery percentage) about its own battery to the portable electronic device 100. Therefore, at operation 270, the control unit 160 can receive charging status information through the short-range wireless communication unit 140 and store it in the memory unit 150.

Figure 3A:
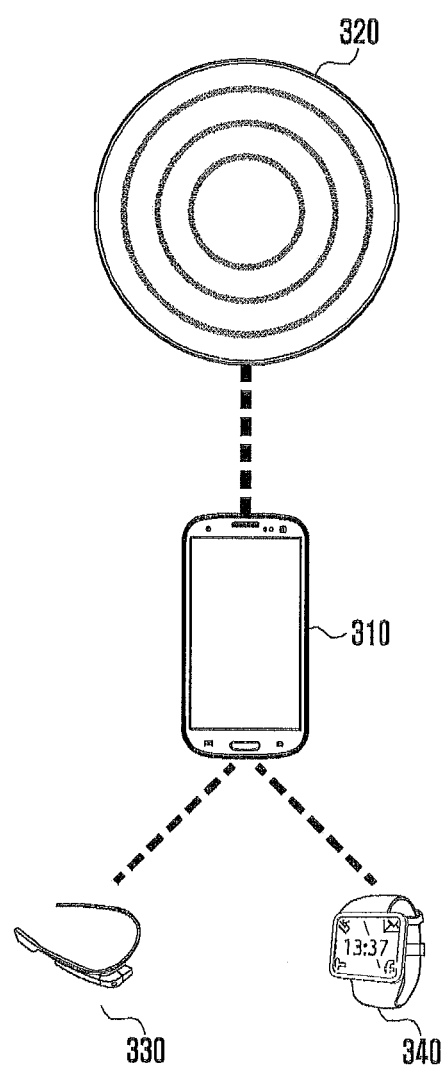
FIGS. 3A and 3B are example schematic diagrams illustrating a wireless charging system without any authentication procedure according to this disclosure.
Figure 3B:
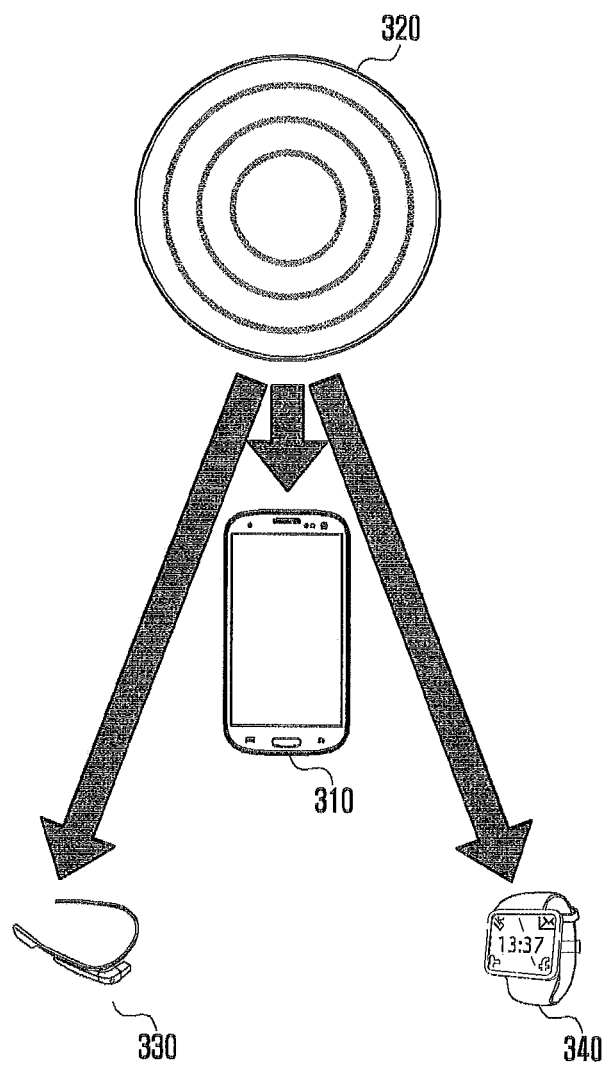

FIGS. 3A and 3B are example schematic diagrams illustrating a wireless charging system without any authentication procedure according to this disclosure.

Referring to FIG. 3A, a portable electronic device 310 can be connected with a charging pad 320 and charge its own battery with electric power received from the charging pad 320. Additionally, the portable electronic device 310 can be connected with peripheral devices, such as a wireless headset 330 and a watch 340. Referring to FIG. 3B, the portable electronic device 310 can transmit a request message for charging a peripheral device to the charging pad 320, and then the charging pad 320 can charge simultaneously the portable electronic device 310, the wireless headset 330 and the watch 340. This simultaneous charging can be based on time division technique. Specifically, at the outset, the charging pad 320 can supply electric power to the portable electronic device 310 by tuning a resonance frequency to the portable electronic device 310. After an elapse of a given time, the charging pad 320 can vary a resonance frequency to retune it to the wireless headset 330 and then can supply electric power to the wireless headset 330. After a further elapse of a given time, the charging pad 320 can vary a resonance frequency to retune it to the watch 340 and then can supply electric power to the watch 340. Through such a periodic variation of a resonance frequency, the charging pad 320 can charge the above charging target devices 310, 330 and 340 by turns.

When there are several rechargeable devices, the portable electronic device 100 can selectively determine a charging target device according to a chargeable time, charging efficiency, or a charging priority. A user can sometimes desire to charge first a certain device before the other target devices and therefore manipulate his or her portable electronic device so as to determine whether to charge each device. In wireless charging technology of a resonance type, an impedance matching technique can be used for authentication and connection between a charging target device and a wireless power supply device. Namely, a wireless charging can be enabled in case of success in matching impedance, whereas a wireless charging can be disabled in case of failure in matching impedance. In this resonance type, the wireless power supply device can manage all wireless charging processes. Namely, impedance matching can be performed in general through a control signal of the wireless power supply device. By the way, according to this disclosure, impedance matching can be controlled in the portable electronic device as well. Namely, a user can manipulate the portable electronic device to enable or disable a wireless charging for each device. This selective wireless charging technique is described herein.

Figure 4A:
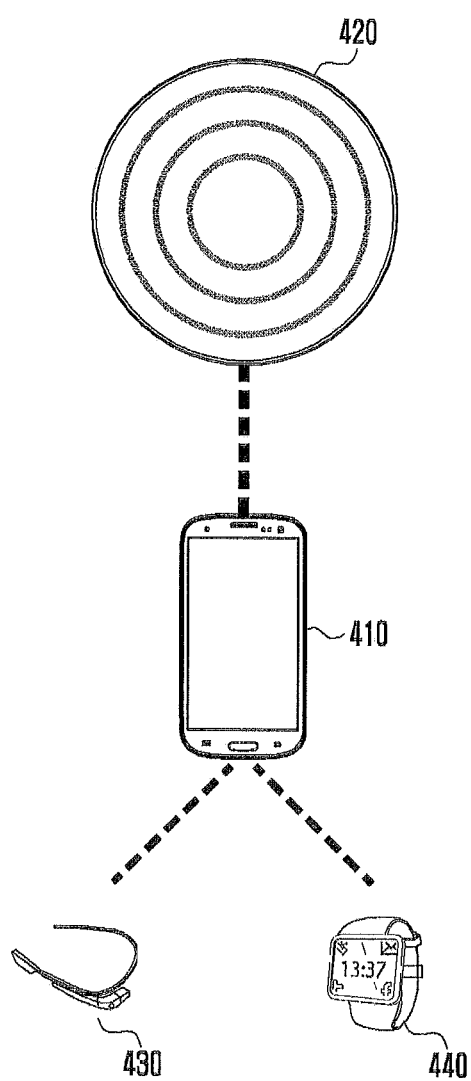
FIGS. 4A, 4B, and 4C are example schematic diagrams illustrating a selective wireless charging system according to this disclosure.
Figure 4B:
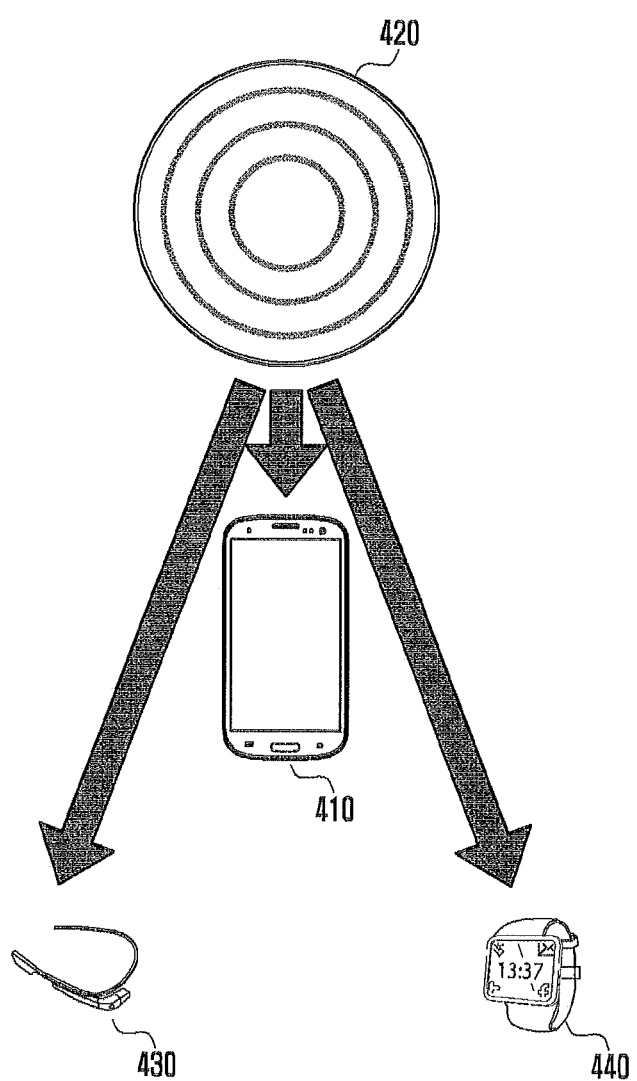
Figure 4C:
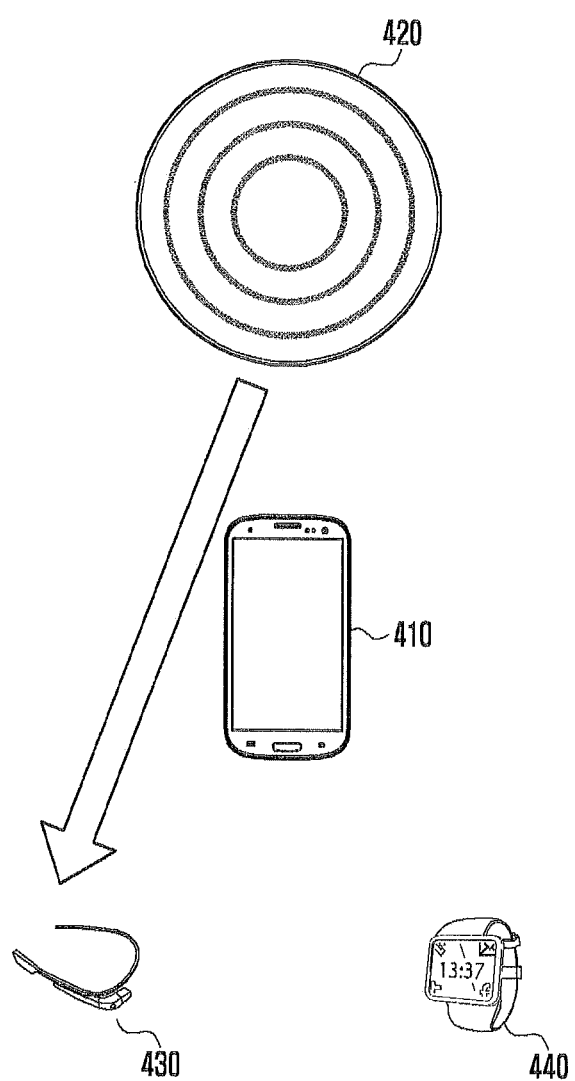

FIGS. 4A, 4B, and 4C are example schematic diagrams illustrating a selective wireless charging system according to this disclosure.

Referring to FIG. 4A, a portable electronic device 410 can be connected with a charging pad 420 and can charge its own battery with electric power received from the charging pad 420. Additionally, the portable electronic device 410 can be connected with peripheral devices, such as a wireless headset 430 and a watch 440. Referring to FIG. 4B, the portable electronic device 410 can transmit a request message for charging a peripheral device to the charging pad 420, and then the charging pad 420 can charge simultaneously the portable electronic device 410, the wireless headset 430 and the watch 440. Additionally, the portable electronic device 410 can display charging status information (such as a battery percentage, charging efficiency, etc.) about each device being charged. Then a user can select a charging target device on the basis of charging status information. The portable electronic device 410 can transmit selection information to the charging pad 420. Referring to FIG. 4C, the charging pad 420 can receive, from the portable electronic device 410, selection information that requests a charging of the wireless headset 430 only. Then the charging pad 420 can maintain a charging process for the wireless headset 430 only while stopping a charging process for both the portable electronic device 410 and the watch 440.

Figure 5:
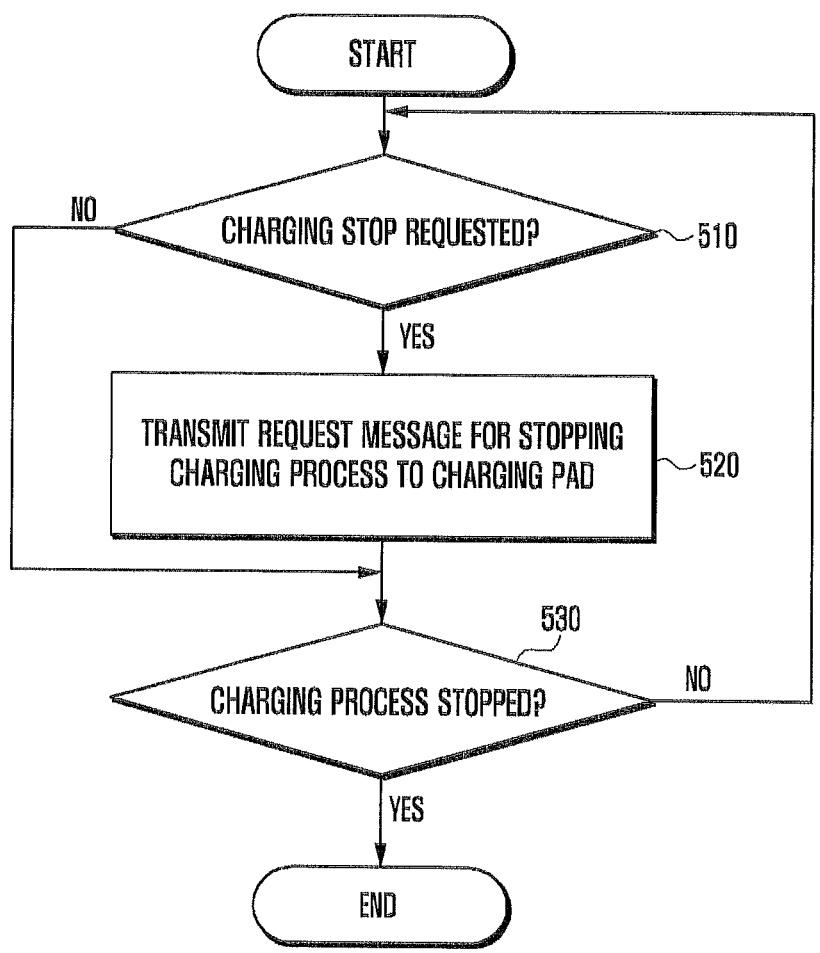
FIG. 5 is an example flow diagram illustrating a selective wireless charging method according to this disclosure.

FIG. 5 is an example flow diagram illustrating a selective wireless charging method according to this disclosure.

Referring to FIG. 5, at operation 510, the control unit 160 can determine whether a user input for requesting a stop of a charging process can be detected through the user interface unit 130. Additionally, at operation 510, the control unit 160 can further determine whether a message for requesting a stop of a charging process can be received from any other portable electronic device (or any peripheral device) through the short-range wireless communication unit 140. When there is a request for a stop of a charging process at operation 510, the control unit 160 can control at operation 520 the short-range wireless communication unit 140 to transmit a request message for stopping a charging process for a selected device to the charging pad. Thereafter, at operation 530, the control unit 160 can determine whether all devices stop a charging process. Each individual device can forcibly stop a charging process in response to a user's request or automatically stop a charging process by a full charge. When there is any device that fails to stop a charging process, a process can return to previous operation 510.

Figure 6:
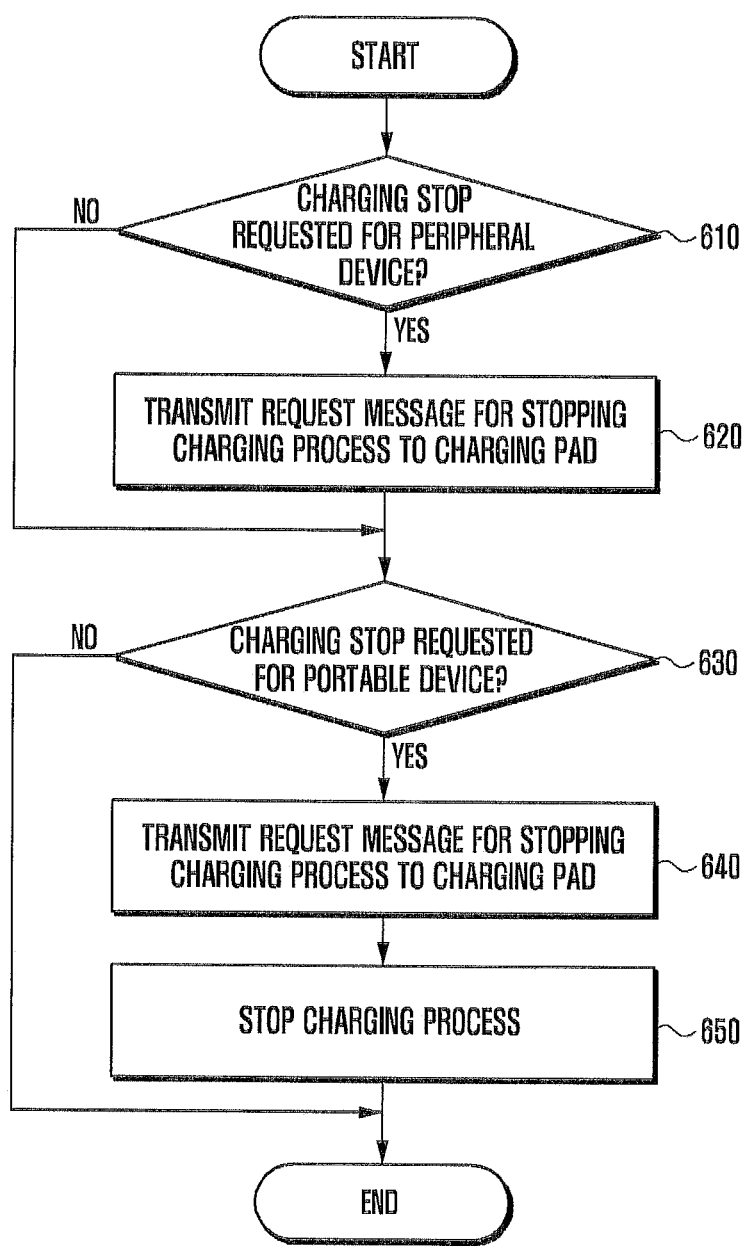
FIG. 6 is an example flow diagram illustrating a selective wireless charging method according to this disclosure.

FIG. 6 is an example flow diagram illustrating a selective wireless charging method according to this disclosure.

Referring to FIG. 6, at operation 610, the control unit 160 can determine whether a user input for requesting a stop of a charging process for a peripheral device can be detected through the user interface unit 130. Additionally, at operation 610, the control unit 160 can further determine whether a message for requesting a stop of a charging process can be received from such a peripheral device through the short-range wireless communication unit 140. When there is a request for a stop of a charging process at operation 610, the control unit 160 can control at operation 620 the short-range wireless communication unit 140 to transmit a request message for stopping a charging process for the peripheral device to the charging pad. In reply to this, the charging pad can omit matching a resonance frequency and impedance with the peripheral device and stop supplying electric power to the peripheral device. After the transmission of the request message, a process can proceed to operation 630. Also, when there is no request for a stop of a charging process for a peripheral device at operation 610, a process can proceed to operation 630.

At operation 630, the control unit 160 can determine whether a user input for requesting a stop of a charging process for the portable electronic device 100 is detected through the user interface unit 130. When there is a request for a stop of a charging process at operation 630, the control unit 160 can control at operation 640 the short-range wireless communication unit 140 to transmit a request message for stopping a charging process for the portable electronic device 100 to the charging pad. In reply to this, the charging pad can omit matching a resonance frequency and impedance with the portable electronic device 100 and can stop supplying electric power to the portable electronic device 100. Then, at operation 650, the control unit 160 can stop a charging process for the battery 120 by inactivating the wireless charging unit 110. Meanwhile, when there is no request for a stop of a charging process for the portable electronic device 100 at operation 630, or after operation 650, a process can be ended.

Figure 7:
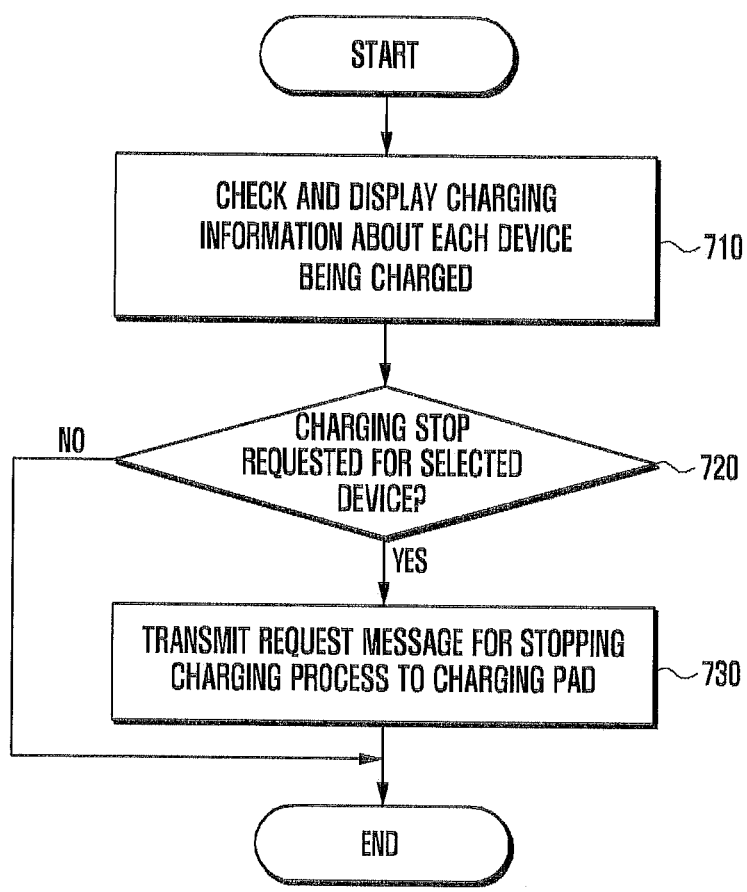
FIG. 7 is an example flow diagram illustrating a selective wireless charging method according to this disclosure.

FIG. 7 is an example flow diagram illustrating a selective wireless charging method according to this disclosure.

Referring to FIG. 7, at operation 710, the control unit 160 can check charging information about each device being now under a charging process, and then can control the display unit of the user interface unit 130 to display the charging information. Here, a checking procedure can include operation of the control unit 160 for checking a charging quantity of the battery 120, operation of the control unit 160 for controlling the short-range wireless communication unit 140 to transmit a charging status request message to other devices being now under a charging process, and operation of the control unit 160 for receiving a response message containing charging status information from such devices through the short-range wireless communication unit 140. In this checking procedure, the controlling operation can be skipped. Namely, each device which is now under a charging process can transmit periodically charging status information to the portable electronic device 100 which acts as a master device. At operation 720, the control unit 160 can determine whether a user input for requesting a stop of a charging process for a selected device is detected through the user interface unit 130. If so, at operation 730, the control unit 160 can control the short-range wireless communication unit 140 to transmit a request message for stopping a charging process for the selected device to the charging pad.

Figure 8:
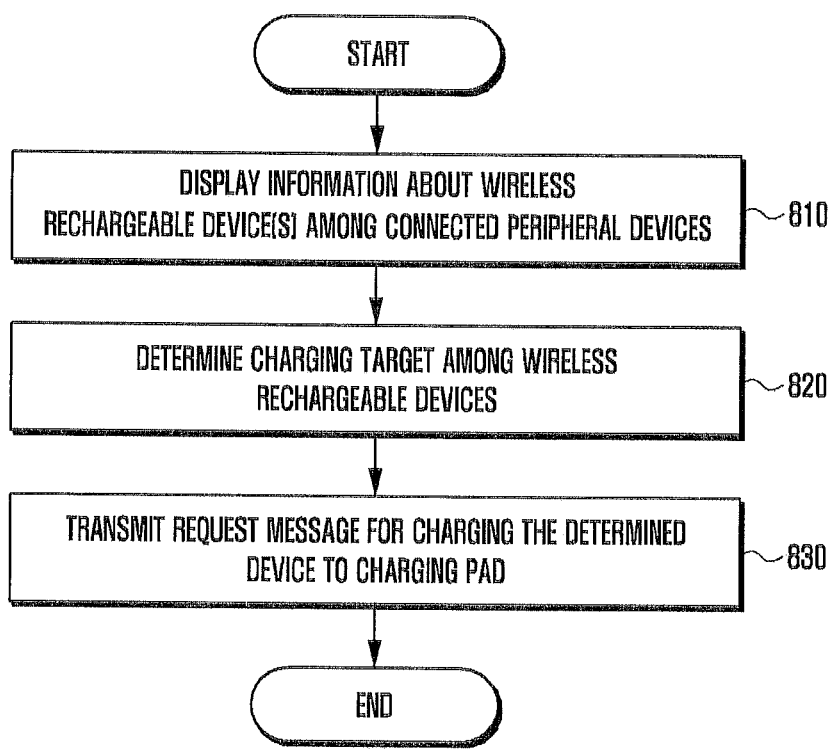
FIG. 8 is an example flow diagram illustrating a selective wireless charging method according to this disclosure.

FIG. 8 is an example flow diagram illustrating a selective wireless charging method according to this disclosure.

Referring to FIG. 8, at operation 810, the control unit 160 can control the display unit of the user interface unit 130 to display information about any wireless rechargeable device from among peripheral devices connected with the portable electronic device 100. Here, the control unit 160 can determine whether each device is available for a wireless charging on the basis of a profile thereof, namely whether each device is a wireless rechargeable device. Specifically, the control unit 160 can access the memory unit 150, retrieve a profile of each peripheral device from the memory unit 150, and when a profile of a specific device contains information (such as resonance frequency band information) associated with a wireless charging, determine that the specific device is a wireless rechargeable device.

At operation 820, the control unit 160 can determine a charging target from among all wireless rechargeable devices. For example, the control unit 160 can determine a charging target in response to a user input received through the user interface unit 130. Alternatively, the control unit 160 can determine a charging target on the basis of a battery percentage. For example, when a simultaneous charging is limited to three devices, and when four devices are wireless rechargeable devices, a device having the highest battery percentage can be excluded from charging targets. Alternatively, the control unit 160 can determine a charging target on the basis of a distance between the charging pad and a wireless rechargeable device. For example, when a simultaneous charging is limited to three devices, and when four devices are wireless rechargeable devices, a device having the longest distance can be excluded from charging targets. In this case, a distance can be calculated from signal strength. Specifically, a wireless rechargeable device can measure the strength of an RF signal received from the charging pad and convert the measured strength into a distance value. Then the wireless rechargeable device can transmit a message containing the distance value to the portable electronic device 100 which is a master device. Alternatively, the control unit 160 can determine a charging target on the basis of priority stored in the memory unit 130. Namely, a device having the lowest priority can be excluded from charging targets.

At operation 830, the control unit 160 can control the short-range wireless communication unit 140 to transmit a message for requesting a wireless charging for a device determined as a charging target to the charging pad. Alternatively, when the charging pad is merely connected, and when electric power is not received currently, the control unit 160 can control at operation 830 the wireless charging unit 110 to transmit a request message to the charging pad.

The portable electronic device 100 in this disclosure can display a charging status of any external device connected thereto and also can offer a graphic user interface used for determining whether to charge or not or determining a priority.

Figure 9A:
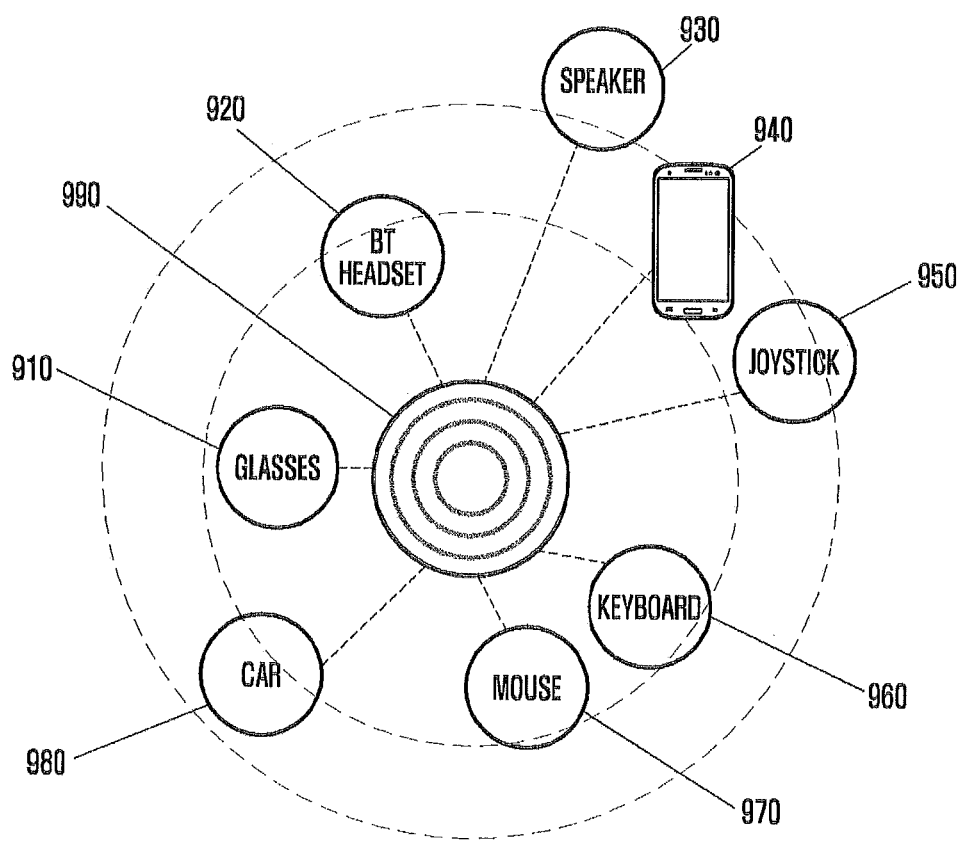
FIGS. 9A, 9B, and 9C are example schematic diagrams illustrating a graphic user interface associated with a wireless charging process according to this disclosure.
Figure 9B:
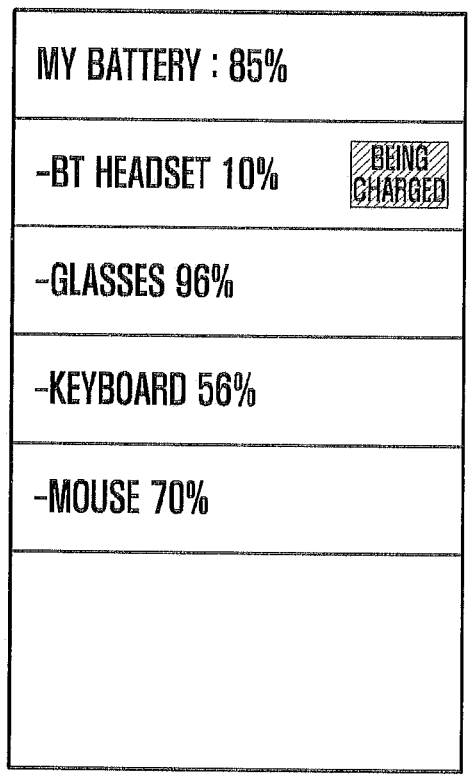
Figure 9C:
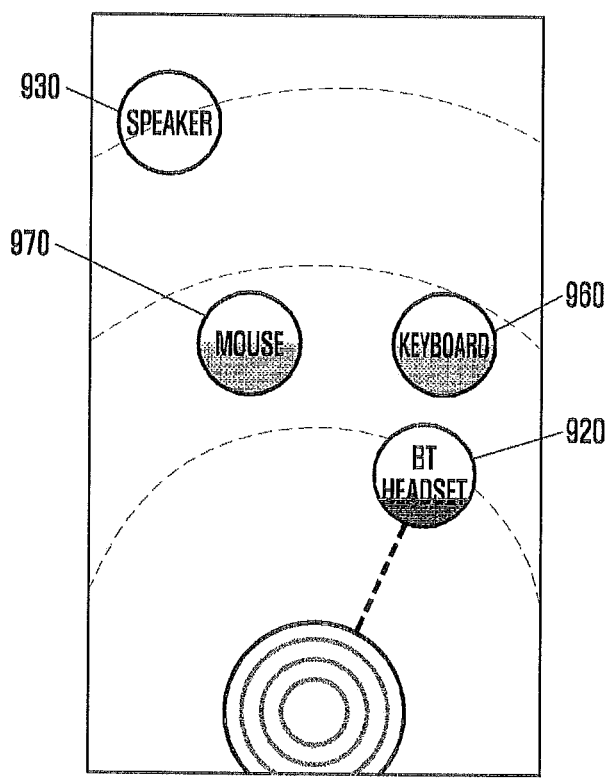

FIGS. 9A, 9B, and 9C are example schematic diagrams illustrating a graphic user interface associated with a wireless charging process according to this disclosure.

The portable electronic device 100 in this disclosure can display battery information and additional information such as distance information in connection with respective peripheral devices. Additional information about peripheral devices can be obtained in various ways. For example, when any peripheral device is equipped with Bluetooth 4.0, also referred to as BLE (Bluetooth Low Energy), a low-power communication can be possible. Using BLE that focuses on a sensing rather than a data communication, unlike Bluetooth 3.0, can allow the portable electronic device 100 to recognize a distance to a peripheral device.

The portable electronic device 100 in this disclosure can transmit a message for requesting battery percentage information to peripheral devices and also can receive a response message containing battery percentage information from peripheral devices. Alternatively, a peripheral device can transmit periodically battery percentage information to the portable electronic device 100. The portable electronic device 100 can monitor a battery percentage of respective individual devices including itself and then can inform a user that a certain device requires a charging thereof. A user can, therefore, decide whether to charge that device. In case of having a battery percentage greater than a given threshold, the portable electronic device 100 can directly supply electric power to peripheral devices. Namely, the portable electronic device 100 can be used as a charging hub like the charging pad.

Referring to FIG. 9A, the portable electronic device 100 can display thereon, in the form of a graphic representation, a charging pad 990 and charging targets such as glasses 910, a wireless headset 920, a speaker 930, other portable device 940, a joystick 950, a keyboard 960, a mouse 970, and a short-range wireless communication unit equipped in a car 980, together with a distance between the charging pad 990 and each charging target.

A wireless non-rechargeable device, even though being connected with the portable electronic device 100, can be excluded from such a graphic user interface. Further, a wireless rechargeable device having lower wireless charging efficiency due to a longer distance to the charging pad can be excluded from a graphic user interface. Meanwhile, as illustrated in FIG. 9B, the portable electronic device 100 can display, in the form of a list, information about a battery percentage of each charging target such as the portable electronic device 100, the wireless headset, the glasses, the keyboard and the mouse. Alternatively, as exemplarily shown in FIG. 9C, the portable electronic device 100 can display, in the form of a graphic representation, information about a battery percentage of each charging target such as the speaker 930, the mouse 970, the keyboard 960 and the wireless headset 920, together with a distance between the charging pad and each charging target.

The portable electronic device 100 in this disclosure can inform a user which device has lower charging efficiency and how to enhance charging efficiency. Here, charging efficiency can indicate real-time charging efficiency or accumulated charging efficiency during a given period. The portable electronic device 100 can record posture information, together with charging efficiency, calculated using the sensor unit in the memory unit 150, estimate a relationship between a posture and charging efficiency, and then utilize estimated information as a guide to charging efficiency. Low charging efficiency can cause an increase in charging time and thus can invite a waste of power required for a wireless charging. Especially, in case the charging pad is a limited power source (namely, when the charging pad supplies power of its own battery to any external device), it can be needed to instruct a user how to enhance charging efficiency. For example, when a distance between the charging pad and a charging target is greater than a given value, the portable electronic device 100 can offer visually or audibly an alerting indication of having to narrow a distance.

Figure 10:
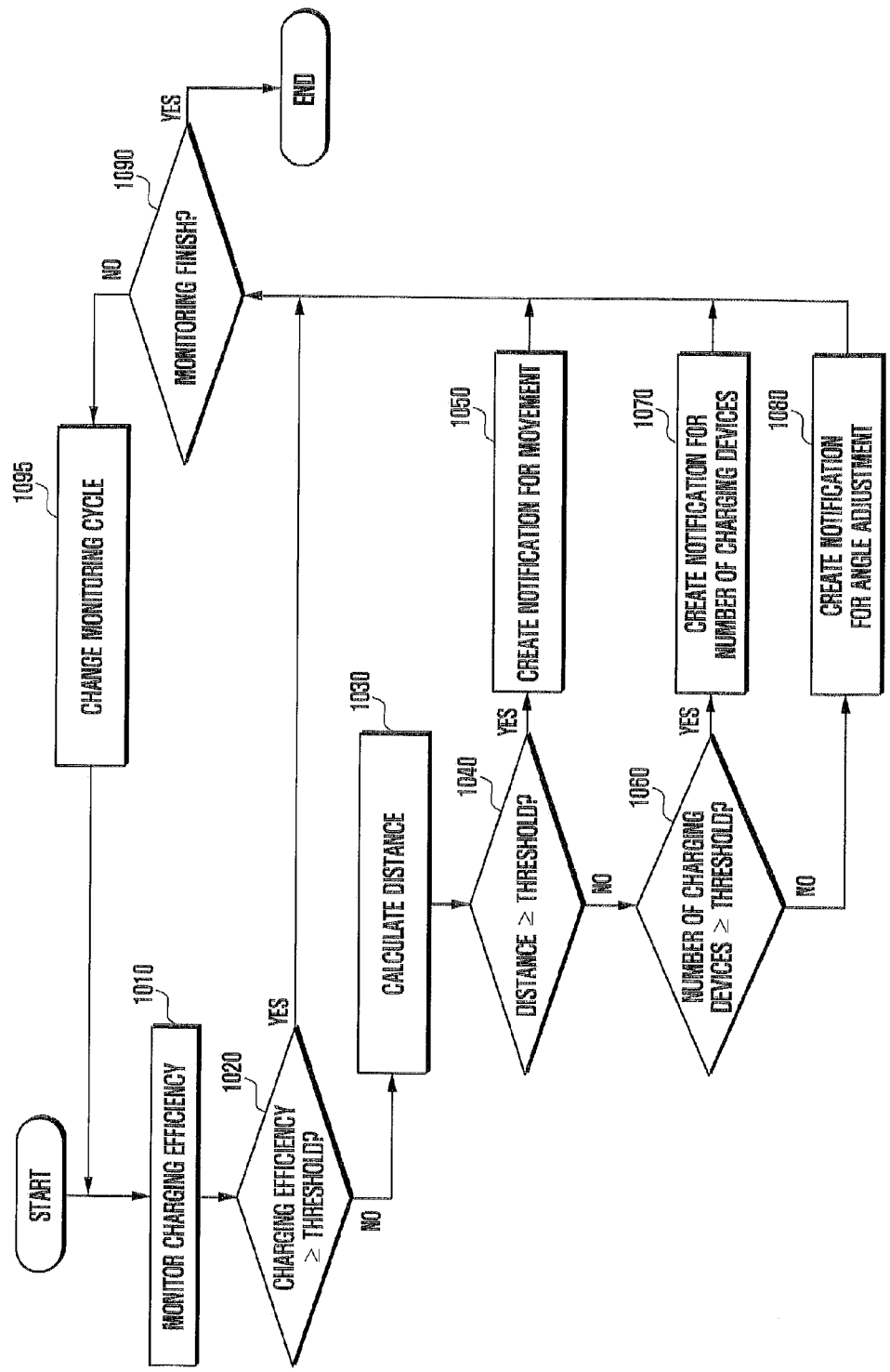
FIG. 10 is an example flow diagram illustrating a wireless charging method for enhancing charging efficiency according to this disclosure.

FIG. 10 is an example flow diagram illustrating a wireless charging method for enhancing charging efficiency according to this disclosure.

Referring to FIG. 10, at operation 1010, the control unit 160 can monitor charging efficiency of a specific device which is being charged. When this device is the portable electronic device 100, the control unit 160 can monitor periodically the charging efficiency (such as a charging rate per a given time) of the battery 120. When this device is an external device, the control unit 160 can receive charging status information (including, for example, a charging rate or charging efficiency) from the external device by requesting such information. Alternatively, the external device can transmit periodically charging status information to the portable electronic device 100 without a request of the portable electronic device 100. When charging rate information is received from the external device, the portable electronic device 100 can calculate charging efficiency from a variation of the received charging rate per a given time (such as one minute). Meanwhile, when there are two or more devices being now charged, monitoring operation (such as operation 1010) can be performed at the same time for respective individual devices.

At operation 1020, the control unit 160 can determine whether the charging efficiency of a specific device being charged is equal to or greater than a given threshold (such as 0.05%/sec in case of real-time charging efficiency or 3%/minute in case of accumulated charging efficiency). When the charging efficiency is equal to or greater than a given threshold, a process can proceed to operation 1090. Alternatively, only when the charging efficiency is greater than a given threshold, a process can proceed to operation 1090. When the charging efficiency is smaller than a given threshold, a process can proceed to operation 1030. Alternatively, when the charging efficiency is equal to or smaller than a given threshold, a process can proceed to operation 1030.

At operation 1030, the control unit 160 can calculate a distance between the charging pad and a device being currently charged. When the portable electronic device 100 has charging efficiency less than (or not exceeding) a given threshold, the control unit 160 can measure the strength of an RF signal received from the charging pad and convert the measured strength into a distance value. When any external device has charging efficiency less than (or not exceeding) a given threshold, the control unit 160 can control the short-range wireless communication unit 140 to transmit a message for requesting strength information to the external device. Then the control unit 160 can convert the received strength information into a distance value. Alternatively, in this case, the control unit 160 can control the short-range wireless communication unit 140 to transmit a message for requesting distance information to the external device and then can receive the requested distance information from the external device.

At operation 1040, the control unit 160 can determine whether the measure or received distance can be equal to or greater than a given threshold (such as 50 cm). If so, at operation 1050 the control unit 160 can create a notification for indicating the need of movement and can control the user interface unit 130 to output this notification. Alternatively, operation 1050 can be performed only when the distance is greater than a given threshold. The notification can include at least one of a vibration trigger signal, voice data, and display data. Namely, the vibration motor of the user interface unit 130 can create a vibration in response to the vibration trigger signal. The speaker of the user interface unit 130 can convert the voice data into a sound and output the sound. The display unit of the user interface unit 130 can display the display data thereon. At operation 1050, a process can proceed to operation 1090.

When it is determined at operation 1040 that the distance is smaller than a given threshold, the control unit 160 can determine at operation 1060 whether the number of devices being currently charged is equal to or greater than a given number (such as three). Alternatively, operation 1060 can be performed when the distance is equal to or smaller than a given threshold. A given number used at operation 1060 can be equal to or less than the number of devices permitting a simultaneous charging as discussed above. When it is determined at operation 1060 that the number of devices is equal to or greater than a given number, at operation 1070 the control unit 160 can create a notification for indicating the number of devices being currently charged and can control the user interface unit 130 to output this notification. Alternatively, operation 1070 can be performed only when the number of devices is greater than a given number. After operation 1070, a process can proceed to operation 1090.

When it is determined at operation 1060 that the number of devices is smaller than a given number, at operation 1080 the control unit 160 can create a notification for indicating the need of an angle adjustment and can control the user interface unit 130 to output this notification. Alternatively, operation 1080 can be performed when the number of devices is equal to or smaller than a given number. After operation 1080, a process can proceed to operation 1090.

At operation 1090, the control unit 160 can determine whether to finish a monitoring. For example, when a charging is stopped for all device connected with the charging pad, a process can be ended. Additionally, when a user input for requesting the finish of a monitoring is received from the user interface unit 130, the control unit 160 can end a process.

When a monitoring is not finished at operation 1090, the control unit 160 can change a monitoring cycle at operation 1095. For example, the control unit 160 can shorten a monitoring cycle for a device having charging efficiency less than a given threshold. Alternatively, operation 1095 can be skipped. Namely, a process can return to operation 1010 without operation 1095.

Figure 11A:
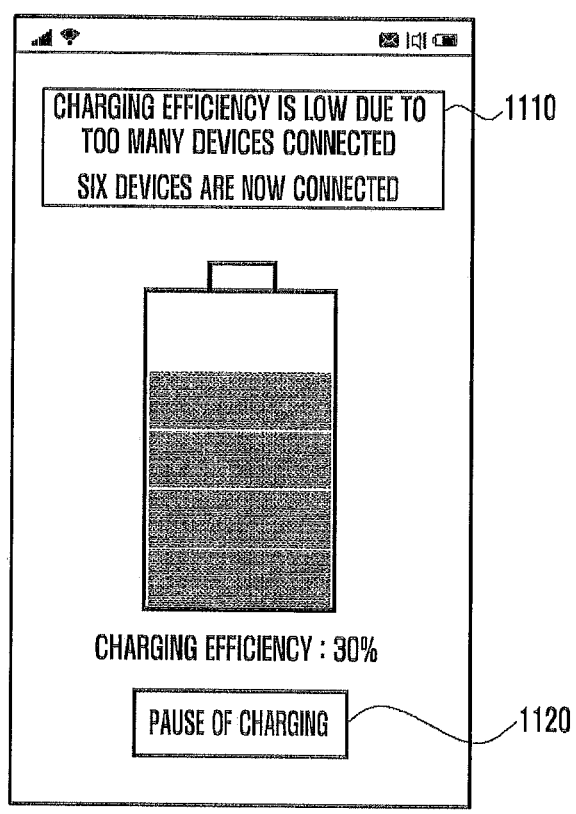
FIGS. 11A, 11B, and 11C are example schematic diagrams illustrating a wireless charging method for enhancing charging efficiency according to this disclosure.
Figure 11B:
Figure 11C:
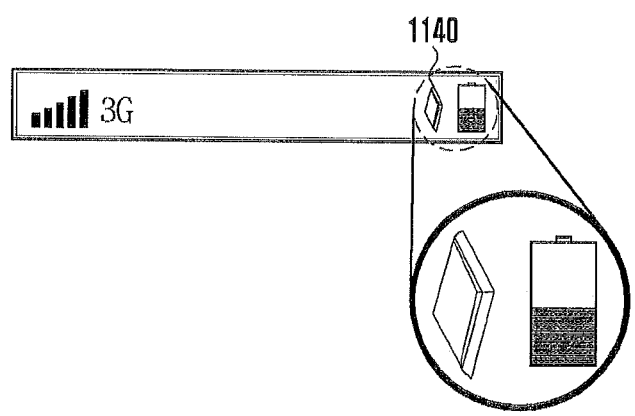

FIGS. 11A, 11E, and 11C are example schematic diagrams illustrating a wireless charging method for enhancing charging efficiency according to this disclosure.

Referring to FIG. 11A, in case it is determined that charging efficiency is degraded as a whole due to too many devices (such as six devices) being currently charged, the portable electronic device 100 can display thereon an alerting indication 1110. Further, the portable electronic device 100 can display thereon a button 1120 designed for a pause of charging. When this button 1120 is selected, the user interface unit 130 can deliver a corresponding user input to the control unit 160. Then the control unit 160 can control the short-range wireless communication unit 140 to transmit a message for requesting the stop of charging to the charging pad. Referring FIGS. 11B and 11C, the portable electronic device 100 can display an alerting indicator 1130 or 1140 in an indicator region used for indicating an operating state of the portable electronic device 100. Also, the portable electronic device 100 can control this alerting indicator 1130 or 1140 to blink.

Meanwhile, a device that has lowering charging efficiency without notifying a user can automatically stop charging.

Figure 12:
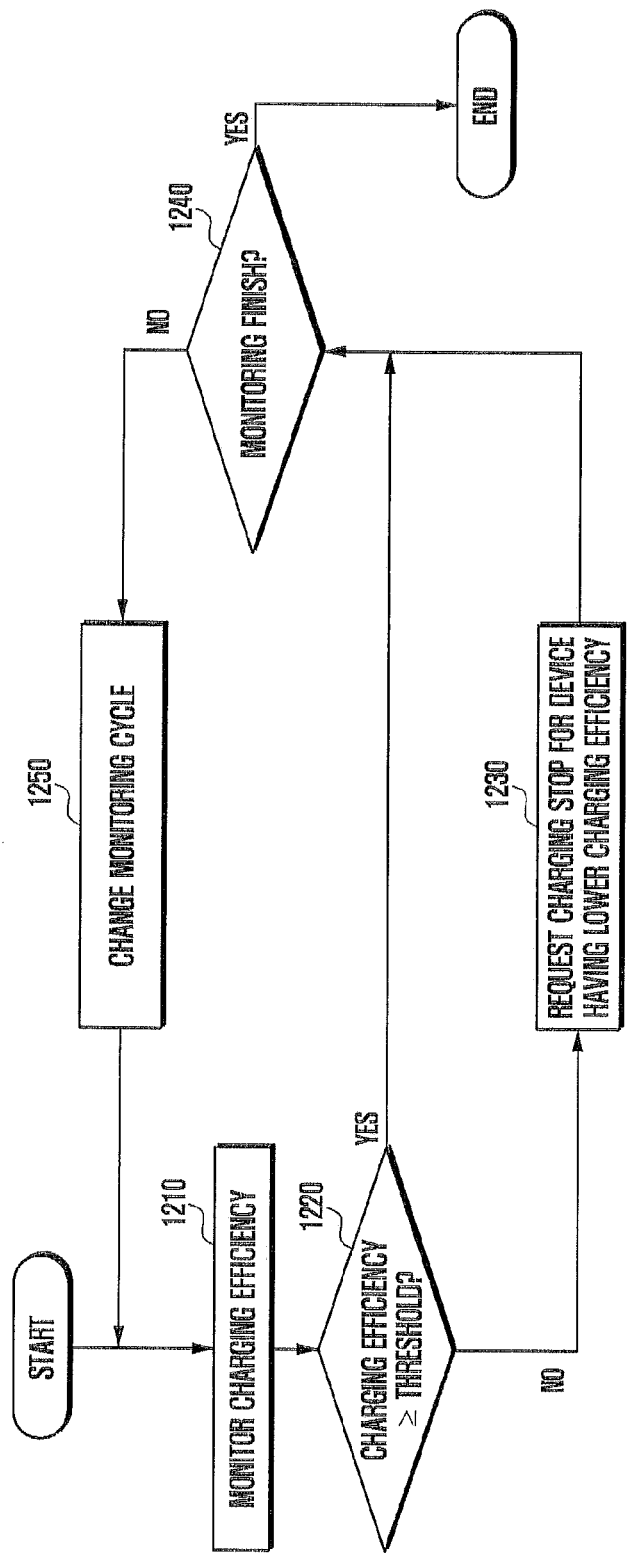
FIG. 12 is an example flow diagram illustrating a wireless charging method for enhancing charging efficiency according to this disclosure.

FIG. 12 is an example flow diagram illustrating a wireless charging method for enhancing charging efficiency according to this disclosure.

Referring to FIG. 12, at operation 1210, the control unit 160 can monitor charging efficiency of a device which is being currently charged. When there are two or more devices being now charged, monitoring operation can be performed at the same time for respective individual devices. At operation 1220, the control unit 160 can determine whether the charging efficiency of such a device being charged is equal to or greater than a given threshold. If so, a process can proceed to operation 1240. In contrast, when the charging efficiency is smaller than a given threshold, a process can proceed to operation 1230.

At operation 1230, the control unit 160 can control the short-range wireless communication unit 140 to transmit, to the charging pad, a message for requesting the stop of a charging for a device having the charging efficiency less than a given threshold.

At operation 1240, the control unit 160 can determine whether to finish a monitoring. When a monitoring is not finished at operation 1240, the control unit 160 can change a monitoring cycle at operation 1250. Alternatively, a process can return to operation 1210 without operation 1250.

As fully discussed hereinbefore, the portable electronic device in this disclosure can enhance the usability of wireless charging and also promote user's satisfaction by improving a wireless (also known as contactless) charging method of resonance type.

The above-discussed method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although the present disclosure has been described with an exemplary embodiment, various changes and modifications may suggested to one skilled in the art. It is intended that the present disclosure encompass such changes and modifications as fall within the scope of the appended claims.

What is claimed is:

1. A wireless charging method in a portable electronic device, the method comprising:
   connecting wirelessly the portable electronic device with a wireless power supply device;
   connecting the portable electronic device with at least one external device;
   monitoring charging efficiency of a device being charged by the wireless power supply device;
   when the charging efficiency is either equal to or smaller than a given first threshold, identifying a distance between the wireless power supply device and the device being charged; and
   when the distance is either equal to or greater than a given second threshold, outputting a notification for indicating a need of movement;
   wherein the portable electronic device is configured to supply electric power to the at least one external device, when the portable electronic device has a battery charging percentage greater than a given threshold.

2. The method of claim 1, further comprising:
   detecting a user input for requesting a stop of a charging process for at least one device selected from devices being currently charged by the wireless power supply device; and
   transmitting a message for requesting a stop of the charging process for the selected at least one device to the wireless power supply device.

3. The method of claim 2, further comprising:
   displaying charging status information about each of the devices being charged.

4. The method of claim 3, wherein the displaying of the charging status information includes one of:
   transmitting a message for requesting the charging status information to an external device from among the devices being currently charged; and
   receiving periodically the charging status information from the external device.

5. The method of claim 1, further comprising:
   displaying charging status information about each connected external device;
   detecting a user input for selecting at least one of the connected external device; and
   transmitting a message for the selected device to the wireless power supply device.

6. The method of claim 1, further comprising:
   when the distance is either equal to or smaller than the given second threshold and when a number of the devices being charged is either equal to or greater than a given number, outputting a notification for indicating the number of the devices being currently charged.

7. The method of claim 6, further comprising:
   when the distance is either equal to or smaller than the given second threshold and when the number of the devices being charged is either equal to or smaller than the given number, outputting a notification for indicating the need of an angle adjustment.

8. The method of claim 1, further comprising:
   monitoring charging efficiency of a device being charged by the wireless power supply device; and
   when the charging efficiency is either equal to or smaller than a given first threshold, transmitting to the wireless power supply device a message for requesting a stop of a charging process for the device being charged.

9. The method of claim 1, wherein the wireless power supply device is of a moveable type.

10. A portable electronic device comprising:
    a battery;
    a wireless charging unit configured to receive wireless electric power from a wireless power supply device and to charge the battery;
    a short-range wireless communication unit configured to connect with at least one external device and to connect with the wireless power supply device;
    a user interface unit configured to interact with a user, and
    a control unit configured to monitor charging efficiency of a device being currently charged by the wireless power supply device, when the charging efficiency is either equal to or smaller than a given first threshold, identify a distance between the wireless power supply device and the device being charged, and when the distance is either equal to or greater than a given second threshold, control the user interface unit to output a notification for indicating a need of movement,
    wherein the portable electronic device is configured to supply electric power to the at least one external device, when the portable electronic device has the battery charging percentage greater than a given threshold.

11. The portable electronic device of claim 10, wherein the control unit is further configured to:
    receive a user input from the user interface unit, the user input requesting a stop of a charging process for at least one selected from devices being charged by the wireless power supply device, and
    control the short-range wireless communication unit to transmit a message for requesting a stop of the charging process for the selected device to the wireless power supply device.

12. The portable electronic device of claim 11, wherein the control unit is further configured to control the user interface unit to display thereon charging status information about each of the devices being charged.

13. The portable electronic device of claim 12, wherein the control unit is further configured to control the short-range wireless communication unit to transmit a message for requesting the charging status information to an external device from among the devices being charged, or receive periodically the charging status information from the external device through the short-range wireless communication unit.

14. The portable electronic device of claim 10, wherein the control unit is further configured to:

control the user interface unit to display thereon charging status information about each connected external device, detect a user input for selecting at least one of the connected external device through the user interface unit, and control the short-range wireless communication unit to transmit a message for the selected external device to the wireless power supply device.

15. The portable electronic device of claim 10, wherein the control unit is further configured, when the distance is either equal to or smaller than the given second threshold and when a number of the devices being charged is either equal to or greater than a given number, to control the user interface unit to output a notification for indicating the number of the devices being currently charged.

16. The portable electronic device of claim 15, wherein the control unit is further configured, when the distance is either equal to or smaller than the given second threshold and when the number of the devices being charged is either equal to or smaller than the given number, to control the user interface unit to output a notification for indicating the need of an angle adjustment.

17. The portable electronic device of claim 10, wherein the control unit is further configured to:

monitor charging efficiency of a device being currently charged by the wireless power supply device, and when the charging efficiency is either equal to or smaller than a given first threshold, control the short-range wireless communication unit to transmit to the wireless power supply device a message for requesting a stop of a charging process for the device being charged.

18. The portable electronic device of claim 10, wherein the wireless power supply device is of a moveable type.

* * * * *